United States Patent [19]

Reddig et al.

[11] Patent Number: 5,436,324
[45] Date of Patent: Jul. 25, 1995

[54] REACTIVE DYESTUFFS CONTAINING A DIFLUOROPYRIMIDINE RADICAL

[75] Inventors: Wolfram Reddig, Bergisch Gladbach; Karl-Josef Herd, Leverkusen, both of Germany

[73] Assignee: Bayer Aktiengesellschaft, Leverkusen, Germany

[21] Appl. No.: 917,881

[22] Filed: Jul. 23, 1992

[30] Foreign Application Priority Data

Aug. 3, 1991 [DE] Germany .......... 41 25 754.5

[51] Int. Cl.$^6$ .......... C09B 62/20; C09B 62/22; C09B 62/24; D06P 1/382
[52] U.S. Cl. .......... 534/625; 534/627; 534/632; 534/635; 534/636; 534/637; 534/638; 544/327
[58] Field of Search .......... 534/625, 627, 632, 635, 534/636, 637, 638; 544/327

[56] References Cited

U.S. PATENT DOCUMENTS 3,669,951  6/1972  Bien et al. .......... 534/638 X
4,065,446 12/1977  Bien et al. .......... 534/632 X

FOREIGN PATENT DOCUMENTS 0065479 11/1982 European Pat. Off. .
2019867  7/1979 United Kingdom .

OTHER PUBLICATIONS

Sietz et al, Chemical Abstracts, 96:201258, (1982).
Dyes and Pigments, vol. 14, No. 4, 1990, pp. 239–263, Barking, Essex, GB; F. Lehr: "Synthesis and Application of Reactive Dyes with Heterocyclic Reactive Systems".

*Primary Examiner*—Mary C. Lee
*Assistant Examiner*—Fiona T. Powers
*Attorney, Agent, or Firm*—Sprung Horn Kramer & Woods

[57] ABSTRACT

Improved reactive dyestuffs of the following formula (I)

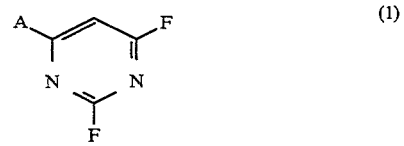

in which the substituents have the meaning given in the description. The improved reactive dyestuffs are highly suitable for the dyeing and printing of natural or synthetic OH— and/or amido-containing materials, in particular, those made of cellulose and polyamides.

5 Claims, No Drawings

REACTIVE DYESTUFFS CONTAINING A DIFLUOROPYRIMIDINE RADICAL

The invention relates to reactive dyestuffs containing a difluoropyrimidine radical.

Although reactive radicals of this type have already been disclosed in German Auslegeschrift 1,644,204 (U.S. application No. 3,669,951) and DE-A-2,114,158 (U.S. application No. 4,065,446), some of them still have problems in practical application.

Furthermore, reactive dyestuffs containing other reactive groups and various chromophores have already been disclosed in EP-A 45,278 and EP-A 65,479 and in German Offenlegungsschrift 2,817,780. These dyestuffs too still need to be improved.

The present invention relates to reactive dyestuffs which, in the form of the free acid, have the formula

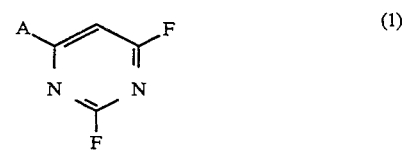

in which

A is a chromophoric radical of one of the following structures

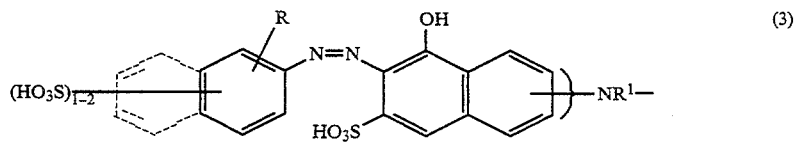

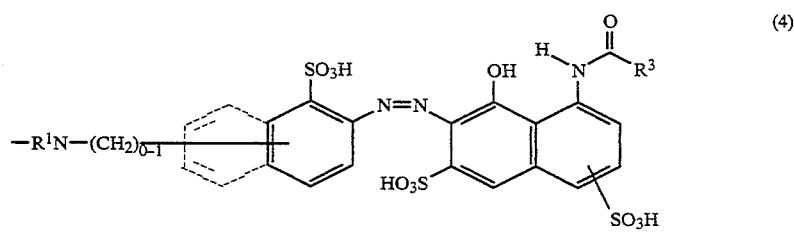

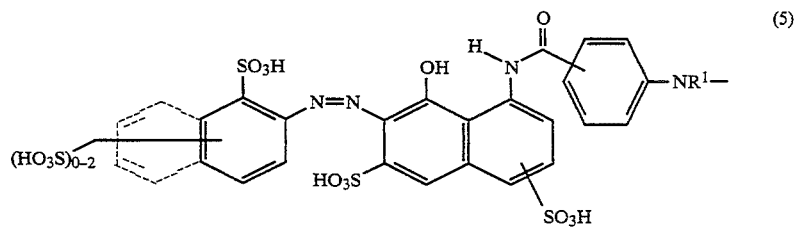

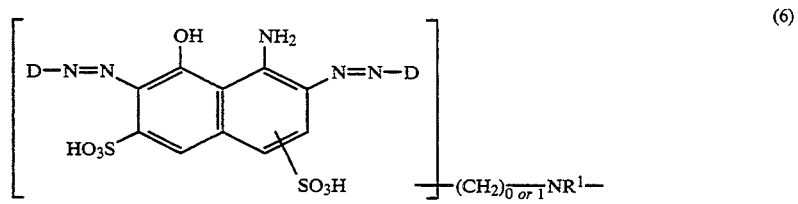

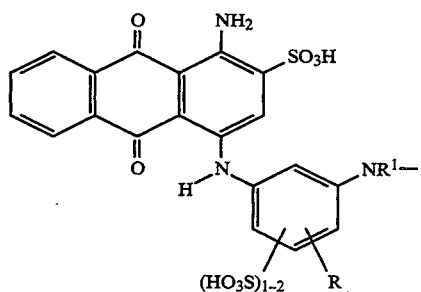
(7)
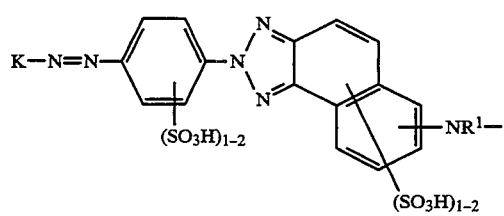
(12)
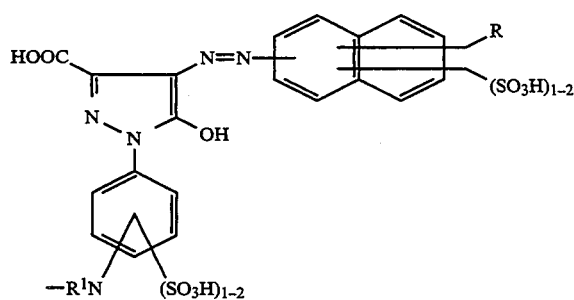
(13)
or
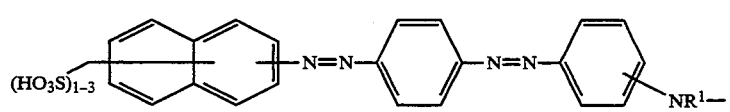
(14)
or metal complexes of dyestuffs of the formulae (8)–(11)
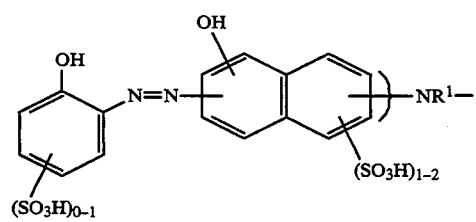
(8)
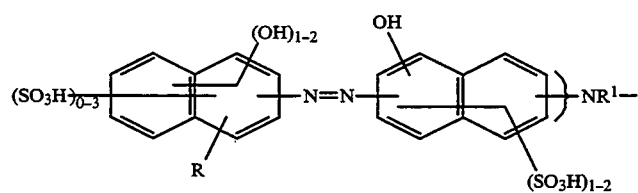
(9)

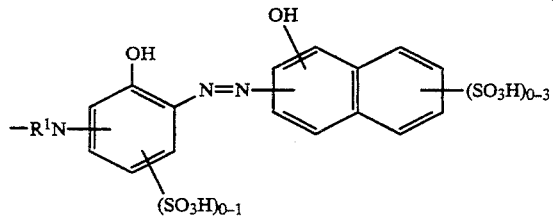

(10)

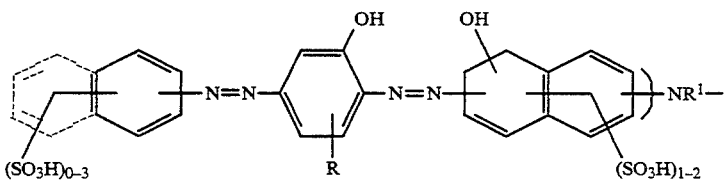

(11)

in which the bond between the chromophoric radical A and the 4-pyrimidinyl radical is effected via an amino or amino-methyl function on a ring C atom and A, in which R denotes H, a $C_1$-$C_6$-alkyl radical, a $C_1$-$C_6$-alkoxy radical, $R^1$ denotes H, $CH_3$, $C_2H_3$, $R^2$ denotes $NH_2$, a $C_1$-$C_4$-alkyl radical which is unsubstituted or substituted by OH, $SO_3H$, $OSO_3H$ or $CO_2H$, a $C_1$-$C_4$-alkoxy radical which is unsubstituted or substituted by OH, $SO_3H$, $OSO_3H$ or $CO_2H$, $R^3$ denotes a $C_1$-$C_4$-alkyl radical which is unsubstituted or substituted by OH, $SO_3H$, $OSO_3H$ or $CO_2H$, a phenyl radical which is unsubstituted or substituted by $C_1$-$C_4$-alkyl, halogen or $SO_3H$, D represents a sulpho- or carboxy-containing radical of a diazo component from the benzene, naphthalene or hetaryl series, which additionally may be substituted by alkyl, alkoxy, carboxyl or halogen radicals, but in formula (6) one of the two radicals D contains an optionally substituted 2,6-difluoro-4-pyrimidinylamino, -methylamino or -ethylamino substituent, it being possible in this case for D to be free of sulpho groups or to contain sulpho groups.

K represents a coupling component, preferably pyridones, pyrazolones, barbituric acid and citrazinic acid derivatives, with the exception of compounds 15 and 16 complex) are preferred. Cr complexes and Co complexes can contain the azo compound of the abovementioned formula once or twice, i.e. they can have a symmetrical structure or, together with any desired other ligand groups, an unsymmetrical structure.

In a further preferred embodiment, the dyestuffs are present as salts, in particular as alkali metal salts or ammonium salts.

Formulae (2) to (14) show the sulpho-containing dyestuff in the form of the free acids. During preparation, the salts are in general obtained, in particular the alkali metal salts, such as sodium salts, potassium salts or lithium salts. However, the dyestuffs can also be used as concentrated solutions.

Preference is given to dyestuffs of the formula (I) where A is a radical of the formulae (2)–(12) in which R is H, $CH_3$, $OCH_3$, $OC_2H_5$, $R^1$ is H, $CH_3$, $R^2$ is $NH_2$, a $C_1$-$C_4$-alkyl radical which is unsubstituted or substituted by OH, $SO_3H$, $OSO_3H$ or $CO_2H$, $R^3$ is $CH_3$, a phenyl radical which is unsubstituted or substituted by $C_1$-$C_4$-alkyl, halogen or $SO_3H$.

Very particular preference is given to a) Dyestuffs of the formula (1) where A is a radical of the formula (2) in which R is H, $R^1$ is H, $CH_3$, $R^2$ is $NH_2$, a $C_1$-$C_4$-alkyl radical which is unsubstituted or substituted by OH, $SO_3H$, $OSO_3H$ or $CO_2H$,

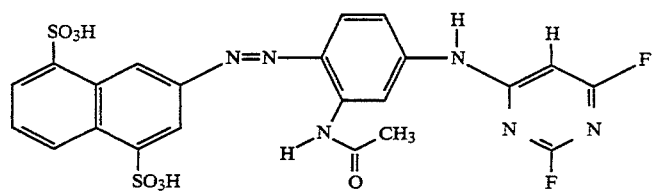

(15)

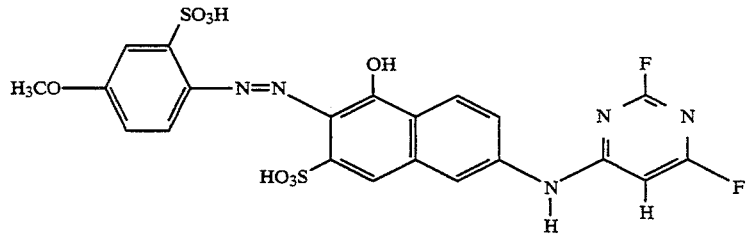

(16)

which are described by F. Lehr in Dyes+Pigments 14 (1990), 239–63.

In a preferred embodiment, in the case of the metal complex dyestuffs, Cu (1:1 complex) or Cr and Co (1:2 and

D is

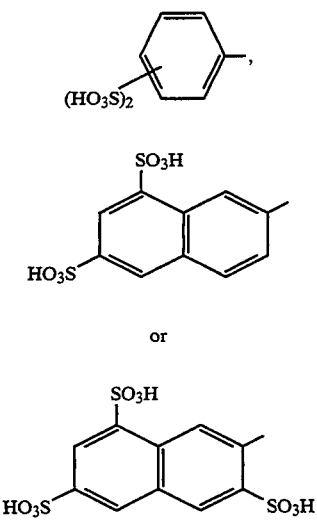

b) Dyestuffs of the formula (1) where A is a radical of the formula (3) in which R is H, CH$_3$, OC$_2$H$_5$, R$^1$ is H, CH$_3$.

c) Dyestuffs of the formula (1) where A is a radical of the formulae (4)–(5) in which R$^1$ is H, CH$_3$, R$^3$ is CH$_3$, a phenyl radical which is unsubstituted or substituted by C$_1$-C$_4$-alkyl, halogen or SO$_3$H.

d) Dyestuffs of the formula (1) where A is a radical of the formula

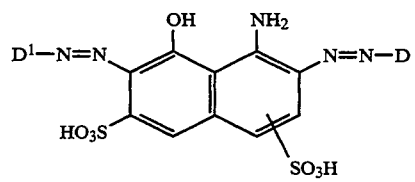

in which

D is

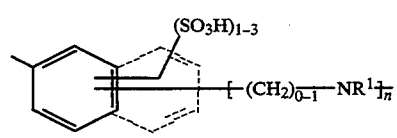

D$^1$ is

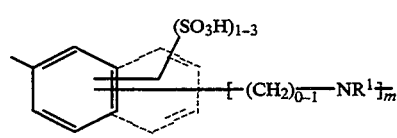

R$^1$ is H, CH$_3$, n=m is 0 or 1 but n+m is 1.

e) Dyestuffs of the formula (1) where A is a radical of the formula

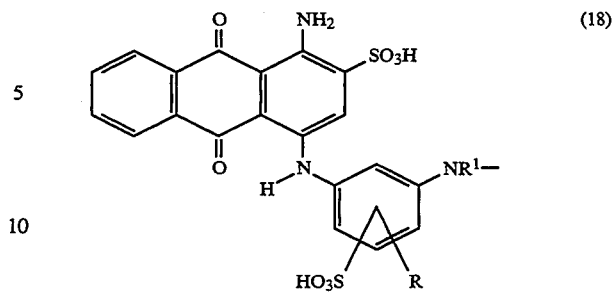

in which

R is H, CH$_3$, OCH$_3$, R$^1$ is H.

f) Dyestuffs of the formula (1) where A is a radical of the formulae (8) to (11), in which R is H.

g) Dyestuffs of the formula (1) where A is a radical of the formula (12), in which R is H and K has the above-mentioned meaning.

The preparation of the dyestuffs (1) is carried out, for example, by the following processes:

1. By condensation of a reactive component of the formula

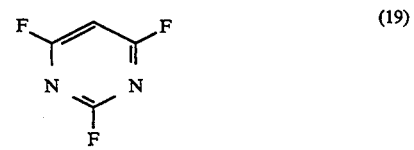

with the corresponding dyestuff bases.

2. By azo coupling of a condensation product of the formulae

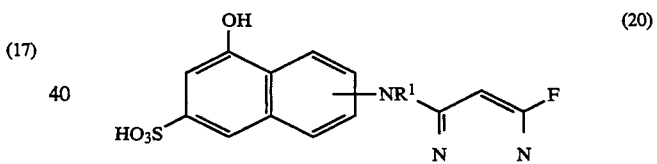

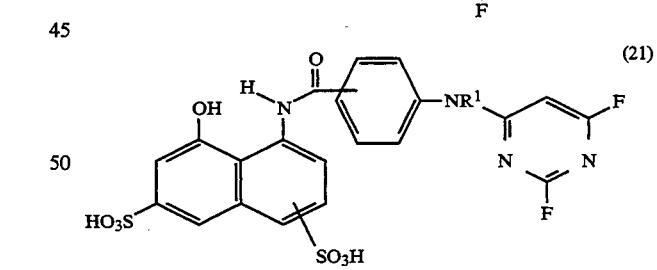

with diazonium compounds, which may be obtained from the amines of the general formula

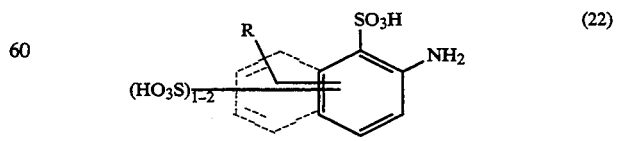

in which R and R$^1$ have the meaning given, in the usual manner;

3. By diazotisation and coupling of an amine of the general formula

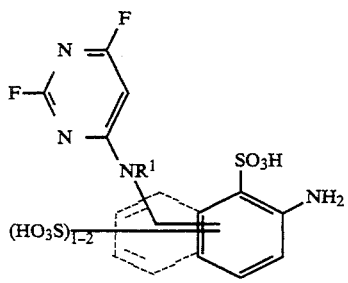

(22)

condensed with 2,4,6-trifluoropyrimidine onto a coupling component of the formula

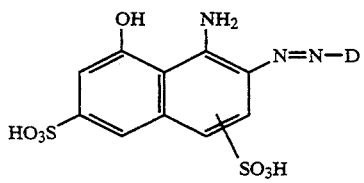

(24)

in which D has the abovementioned meaning.

The reactive component 2,4,6-trifluoropyrimidine is known from German Auslegeschrift 2,114,158 (U.S. application No. 4,065,446) and can be obtained, for example, from 2,4,6-trichloropyrimidine by fluoride exchange using HF or alkali metal fluorides in aprotic solvents.

The dyestuffs according to the invention are highly suitable for the dyeing and printing of natural or synthetic OH— and/or amido-containing materials, in particular those made of cellulose and polyamides. They are particularly suitable for the dyeing of cellulose materials by the exhaust and cold pad-batch method and for the printing of cellulose materials, such as cotton or staple viscose.

When mixed with other dyestuffs, the dyestuffs can be used for trichromatic dyeing.

Dyeings having good general fastness properties, in particular wet fastness properties, in combination with good build-up properties and high fixation yields are obtained.

EXAMPLE 1

23.6 g of 7-amino-1,3-naphthalenedisulphonic acid mono-sodium salt are stirred in 150 ml of water/30 g of ice and 20 ml of concentrated hydrochloric acid, and 17 ml of an aqueous sodium nitrite solution (300 g of NaNO$_2$/l) are added dropwise at 5°-10° C. After stirring at 5°-10° C. for one hour, excess nitrous acid is removed using sulphamic acid.

This cream-coloured suspension is then metered into a neutral solution of the coupling component prepared from 13.5 g of N-(3-aminophenyl)-acetamide hydrochloride, 50 ml of water, 50 g of ice and about 30 ml of a 10% strength aqueous lithiumhydroxide solution over a period of 30 minutes. During this addition, the pH of the reaction mixture is kept constant at 6.0 to 6.5 with 20% aqueous potassium bicarbonate solution. If possible, the temperature should not exceed 10° C. After addition is complete, stirring is continued for another 30 minutes, during which the pH is still kept constant.

The coupling solution is warmed to 40° C., and 12 g of 2,4,6-trifluoropyrimidine are added. During the condensation reaction, the pH is kept constant at 5.8–6.2 with lithium hydroxide solution. After 3 hours, hardly any more change in the pH can be observed, and the condensation, according to TLC analysis, is complete. The dyestuff solution is clarified in order to separate off insoluble components, such as lithium fluoride, and salted out with 50 g of sodium chloride. The precipitated dyestuff is filtered off with suction and dried, giving 40 g of an orange-red powder (λmax=395.2 nm (H$_2$O)), which has the structure

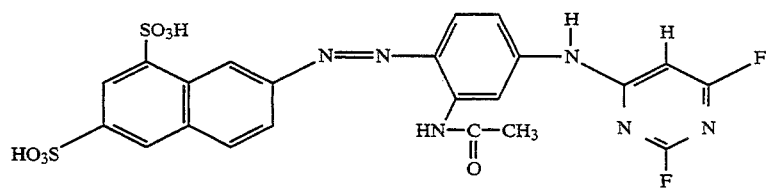

and dyes cotton in golden yellow hues having excellent fastness properties.

By varying the diazo component D-NH$_2$ and the coupling component containing R, R$^1$ and R$^2$, further valuable golden yellow reactive dyestuffs of the formula

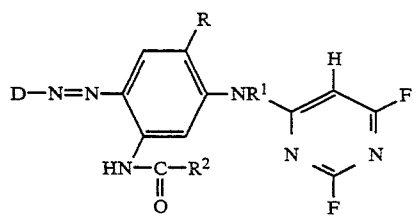

which are listed in the table below, are available analogously to Example 1.

TABLE 1

| Ex. | D | R | R$^1$ | R$^2$ | λmax (H$_2$O) |
|---|---|---|---|---|---|
| 2 | ![](SO$_3$H/HO$_3$S-naphthyl) | H | H | NH$_2$ | |

TABLE 1-continued

| Ex. | D | R | R¹ | R² | $\lambda$max (H$_2$O) |
|---|---|---|---|---|---|
| 3 | " | H | H | C$_2$H$_5$ | |
| 4 | " | H | H | CH$_2$—OH | |
| 5 | " | H | H | CH$_2$—OSO$_3$H | |
| 6 | " | H | H | CH$_2$—CH$_2$—COOH | |
| 7 | " | CH$_3$ | H | NH$_2$ | |
| 8 | " | H | CH$_3$ | NH$_2$ | |
| 9 | " | H | C$_2$H$_5$ | NH$_2$ | |
| 10 | " | H | C$_2$H$_5$ | CH$_3$ | |
| 11 | benzene with SO$_3$H, HO$_3$S, CH$_3$ substituents | H | H | NH$_2$ | 406 nm |
| 12 | " | H | H | CH$_3$ | |
| 13 | " | H | H | C$_2$H$_5$ | |
| 14 | " | H | H | CH$_2$—OH | |
| 15 | " | H | H | CH$_2$—OSO$_3$H | |
| 16 | " | H | H | CH$_2$—CH$_2$—COOH | |
| 17 | " | CH$_3$ | H | NH$_2$ | |
| 18 | " | H | CH$_3$ | NH$_2$ | |
| 19 | " | H | C$_2$H$_5$ | NH$_2$ | |
| 20 | " | H | C$_2$H$_5$ | CH$_3$ | |
| 21 | naphthalene with SO$_3$H, HO$_3$S, SO$_3$H, CH$_3$ substituents | H | H | NH$_2$ | 420 nm |
| 22 | " | H | H | CH$_3$ | 401 nm |
| 23 | " | H | H | C$_2$H$_5$ | |
| 24 | " | H | H | CH$_2$OH | |
| 25 | " | H | H | CH$_2$—OSO$_3$H | |
| 26 | " | H | H | CH$_2$—CH$_2$—COOH | |
| 27 | " | CH$_3$ | H | NH$_2$ | |
| 28 | " | H | CH$_3$ | NH$_2$ | |
| 29 | " | H | C$_2$H$_5$ | NH$_2$ | |
| 30 | " | H | C$_2$H$_5$ | CH$_3$ | |
| 31 | naphthalene with SO$_3$H, CH$_3$, SO$_3$H substituents | H | H | NH$_2$ | |
| 32 | " | H | H | C$_2$H$_5$ | |
| 33 | " | H | H | CH$_2$—OH | |
| 34 | " | H | H | CH$_2$—OSO$_3$H | |
| 35 | " | H | H | CH$_2$—CH$_2$—COOH | |
| 36 | " | CH$_3$ | H | NH$_2$ | |
| 37 | " | H | CH$_3$ | NH$_2$ | |
| 38 | " | H | C$_2$H$_5$ | NH$_2$ | |
| 39 | " | H | C$_2$H$_5$ | CH$_3$ | |

EXAMPLE 40

10.4 g of 7-amino-4-hydroxy-2-naphthalenesulphonic acid are dissolved in 150 ml of water at a pH of 7 using lithium hydroxide. 7.6 g of 2,4,6-trifluoropyrimidine are added, the reaction mixture is heated to 40° C. and the pH is maintained at the same time at 6.5 with lithium carbonate solution. After stirring for 3 hours, the mixture is cooled to 10° C. and, while maintaining the pH at 6.5 with lithium carbonate solution, a suspension of 14.1 g of diazotised 1,5-naphthalenesulphonic acid are added. After 1 hour, azo coupling is complete, and the dyestuff is salted out, isolated and dried; it has the formula

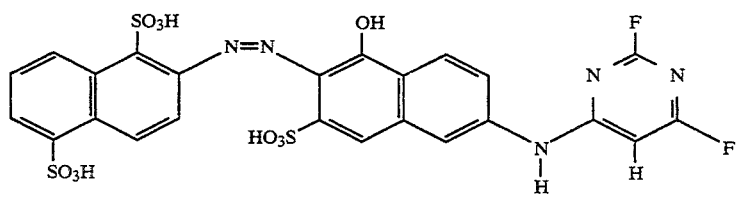

($\lambda$max=485 nm (H$_2$O)) and dyes cotton in brilliant orange shades having very good wet fastness properties.

A further method to prepare the dyestuff from Example 40 consists in condensing the azo dyestuff of the formula

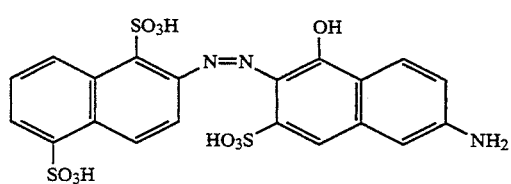

with 2,4,6-trifluoropyrimidine at a pH of 6.5–7.5.

By varying the diazo component D-NH$_2$ and the coupling component K$^1$H$_2$, the dyestuffs of the general formula

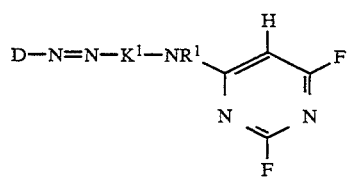

listed in the table below, which dye cotton in the hues mentioned, can be prepared analogously to Example 40.

TABLE 2

| Ex. | D | K$^1$ | R$^1$ | Hue $\lambda$max (H$_2$O) |
|---|---|---|---|---|
| 41 | HO$_3$S–[naphthalene with SO$_3$H, SO$_3$H] | HO$_3$S–[naphthalene with OH, NR$^1$–] | H | orange |
| 42 | H$_5$C$_2$O–[phenyl with SO$_3$H]– | " | H | yellowish red |
| 43 | H$_3$CO–[phenyl with SO$_3$H, HO$_3$S]– | " | H | orange |
| 44 | H$_3$C–[phenyl with SO$_3$H]– | " | H | orange |
| 45 | H$_3$C–[phenyl with SO$_3$H, HO$_3$S]– | " | H | orange |

TABLE 2-continued

| Ex. | D | K¹ | R¹ | Hue λmax (H₂O) |
|---|---|---|---|---|
| 46 | 1-naphthyl-2-methyl-1,5-disulfonic acid | 4-hydroxy-3-methyl-7-(NR¹)-naphthalene-2-sulfonic acid | CH₃ | orange |
| 47 | 2-methylnaphthalene-1-sulfonic acid | " | H | yellowish red |
| 48 | 4-methoxy-2-methylbenzenesulfonic acid | " | CH₃ | yellowish red |
| 49 | " | " | C₂H₅ | yellowish red |
| 50 | 2-methylnaphthalene-1,5,7-trisulfonic acid | 8-hydroxy-7-methyl-2-(NR¹)-naphthalene-6-sulfonic acid | H | red |
| 51 | 4-methoxy-2-methylbenzenesulfonic acid | " | H | yellowish red |
| 52 | 4-ethoxy-2-methylbenzenesulfonic acid | 8-hydroxy-7-methyl-2-(NR¹)-naphthalene-6-sulfonic acid | H | yellowish red |
| 53 | 4-methoxy-2-methyl-5-sulfobenzenesulfonic acid | " | H | yellowish red |
| 54 | 2,5-dimethylbenzenesulfonic acid | " | H | orange |
| 55 | 2,5-dimethyl-4-sulfobenzenesulfonic acid | " | H | orange |

TABLE 2-continued

| Ex. | D | K¹ | R¹ | Hue λmax (H₂O) |
|---|---|---|---|---|
| 56 | naphthalene with SO₃H (1), CH₃ (2), SO₃H (5) | " | H | red |
| 57 | naphthalene with SO₃H and CH₃ | 3-methyl-4-hydroxy-7-(NR¹—)-6-sulfo naphthalene | H | red |
| 58 | 4-methoxy-2-sulfophenyl | " | CH₃ | yellowish red |
| 59 | 4-methoxy-2-sulfophenyl | " | C₂H₅ | yellowish red |

EXAMPLE 60

29.6 g of 1,3-diaminobenzene-6-sulphonic acid are dissolved in 250 ml of water at pH 6.5. After addition of 0.75 g of sodium dihydrogen phosphate×2 H₂O and 0.75 g of disodium hydrogen phosphate×12 H₂O, 15 ml of 2,4,6-trifluoropyrimidine are added dropwise. The mixture is stirred at 50° C. for 6 hours, during which the pH is maintained at 6.5 with sodium carbonate solution. After clarification using activated carbon, the dyestuff intermediate is diazotised at 0° C. with 7 ml of concentrated hydrochloric acid and 9 ml of 30% strength sodium nitrite solution, and the diazotised product is added to a previously introduced solution of 31.2 g of 1-benzoyl-amino-8-hydroxy-naphthalene-3,6-disulphonic acid, during which the pH is maintained at 7 with sodium carbonate solution. After 1 hour, the coupling reaction to give the dyestuff is complete, and the dyestuff is salted out, filtered off with suction, washed and dried at about 50° C. in vacuo. It has the following structure

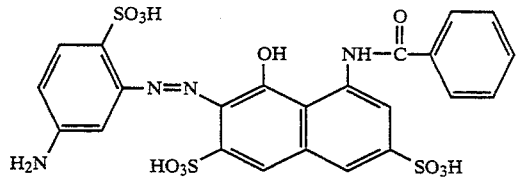

with 2,4,6-trifluoropyrimidine at pH 6–7 and 50° C.

By varying the diazo component HD²NH₂ and the coupling component KH, the dyestuffs of the general formula

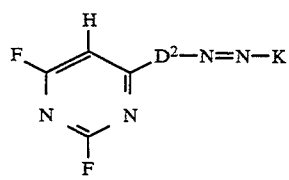

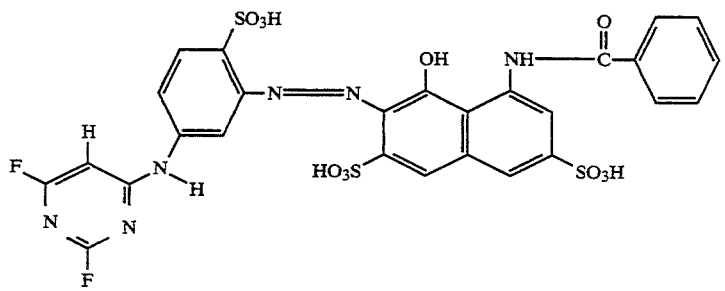

and dyes cellulose materials in a clear bluish red shade.

An alternative preparation process consists in condensing a dyestuff base of the structure listed in the table below, which dye cotton in red to bluish red hues, can be prepared analogously to Example 60.

TABLE 3a / TABLE 3a-continued

| Ex. | D² | K | R¹ | λmax (H₂O) |
|---|---|---|---|---|
| 61 | SO₃H-phenyl(CH₃)-NR¹ | 8-OH, 7-CH₃, 3,6-di-SO₃H, 4-NHCOCH₃ naphthalene | H | |
| 62 | SO₃H-phenyl(CH₃)-CH₂-NR¹ | " | H | |
| 63 | SO₃H-phenyl(CH₃)-NR¹ | " | CH₃ | |
| 64 | SO₃H-(CH₃)-naphthyl-CH₂-NR¹ | " | H | |
| 65 | SO₃H-phenyl(CH₃)-NR¹ | 8-OH, 7-CH₃, 6-SO₃H, 4-SO₃H, 1-NHCOCH₃ naphthalene | H | |
| 66 | SO₃H-phenyl(CH₃)-CH₂-NR¹ | " | H | |
| 67 | SO₃H-phenyl(CH₃)-NR¹ | " | CH₃ | |
| 68 | SO₃H-(CH₃)-naphthyl-CH₂-NR¹ | " | H | |
| 69 | SO₃H-phenyl(CH₃)-CH₂-NR¹ | 8-OH, 7-CH₃, 3,6-di-SO₃H, 4-NHCOC₆H₅ naphthalene | H | |
| 70 | SO₃H-phenyl(CH₃)-NR¹ | " | CH₃ | |
| 71 | SO₃H-(CH₃)-naphthyl-CH₂-NR¹ | " | H | 543 nm |
| 72 | SO₃H-phenyl(CH₃)-NR¹ | 8-OH, 7-CH₃, 6-SO₃H, 4-SO₃H, 1-NHCOC₆H₅ naphthalene | H | |
| 73 | SO₃H-phenyl(CH₃)-CH₂-NR¹ | " | H | |
| 74 | SO₃H-phenyl(CH₃)-NR¹ | " | CH₃ | |
| 75 | SO₃H-(CH₃)-naphthyl-CH₂-NR¹ | " | H | 512 nm |

By varying the diazo component D-NH₂ and the coupling component K¹H₂, the dyestuffs of the general formula

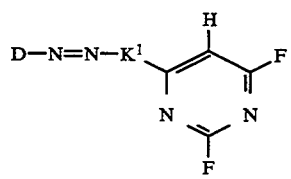

listed in the table below can be prepared analogously to Example 60. They dye cotton in red to bluish red hues.

TABLE 3b

| Ex. | D | K¹ | R¹ | λmax (H₂O) |
|---|---|---|---|---|
| 76 | (2-methylbenzenesulfonic acid) | 8-hydroxy-7-methyl-6-sulfo-naphthalene with 4-(NR¹)-benzamido at 5-position, 3-SO₃H | H | 535 nm |
| 77 | 2-methylnaphthalene-1,5-disulfonic acid | same K¹ as 76 | H | |
| 78 | 2-methylbenzenesulfonic acid | same K¹ as 76 | CH₃ | |
| 79 | " | 8-hydroxy-7-methyl-6-sulfo-naphthalene with 4-(NR¹)-benzamido, 1-SO₃H isomer | H | |
| 80 | 2-methylnaphthalene-1,5-disulfonic acid | " | H | |
| 81 | 2-methylbenzenesulfonic acid | " | CH₃ | |

EXAMPLE 82

49.2 g of the diazotisation solution from Example 60 are metered into a solution of 82.5 g of the monoazo compound of the formula

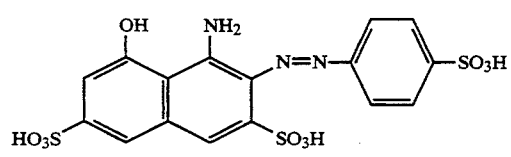

in 500 ml of water at a pH of 7 over a period of 15 to 20 minutes, during which the pH is maintained between 6 and 8 by addition of a 20% strength sodium carbonate solution. To complete the coupling reaction, stirring of the mixture at a pH of 7–8 is continued for 1 hour, and the dyestuff is then salted out by addition of 70 g of common salt. Isolation and drying gives about 150 g of a salt-containing black dyestuff powder which has the structure

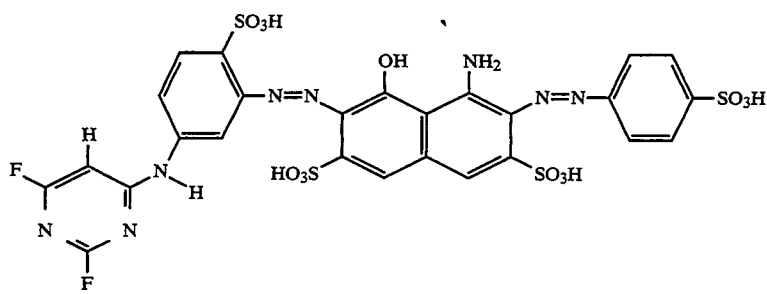

and dyes cotton in navy to black hues by the dyeing or printing processes customary for reactive dyestuffs.

This reactive dyestuff can also be prepared by condensing a solution of 133.4 g of the diazo dyestuff base of the formula

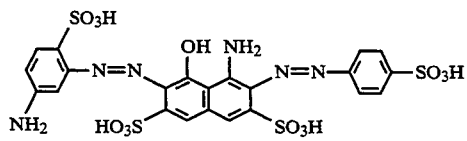

in 750 ml of water at 50° C. and a constant pH of 6–7, (addition of sodium carbonate solution) with 24 g of 2,4,6-trifluoropyrimidine and isolating the dyestuff at 20°–25° C. as described above.

Further valuable reactive dyestuffs are obtained by varying, analogously to Example 82, the diazo components as follows:

TABLE 4

| Example | Z—B—D— | D'— | Hue |
|---|---|---|---|
| 83 | (phenyl with SO₃H, Z—HN) | (phenyl with HO₃S, SO₃H) | navy/black (610 nm) |
| 84 | " | (phenyl with HO₂C) | navy (602 nm) |
| 85 | " | (benzothiazole with SO₃H, CH₃, SO₃H) | greenish blue |
| 86 | (phenyl with SO₃H, Z—HN) | (phenyl with HO₃S, SO₃H) | navy (611 nm) |

TABLE 4-continued

Structure: Z—B—D—N=N— [naphthalene with OH, NH₂, HO₃S, SO₃H] —N=N—D'

Z = difluoropyrimidinyl group

| Example | Z—B—D— | D'— | Hue |
|---------|--------|-----|-----|
| 87 | " | 2-methylphenyl-SO₃H | navy/black (600 nm) |
| 88 | " | 4-methylphenyl-CO₂H | navy |
| 89 | Z—HN—(2-methyl-4-aminophenyl)-SO₃H | 6-methylnaphthalene-1,3-disulfonic acid | greenish black |
| 90 | " | HO₃S-substituted methylphenyl-N=N-phenyl-SO₃H | dark green |
| 91 | " | methylphenyl-N=N-(2,5-disulfophenyl) | " |
| 92 | Z—HN—(methyl-sulfophenyl) | phenyl-SO₃H | greenish dark blue |
| 93 | " | methyl-disulfophenyl | " |
| 94 | Z—HN—(methyl-sulfophenyl) | 6-methylnaphthalene-1,5-disulfonic acid | greenish dark blue |

TABLE 4-continued

Structure: Z—B—D—N=N— [naphthalene with OH, NH₂, HO₃S, SO₃H] —N=N—D′

Z = pyrimidine with F, N, N, F, H substituents

| Example | Z—B—D— | D′— | Hue |
|---------|--------|-----|-----|
| 95 | 4-SO₃H-phenyl with 3-CH₂-N(CH₃)-Z | 4-SO₃H-phenyl | reddish navy |
| 96 | " | 3-SO₃H-phenyl | " |
| 97 | " | naphthyl with SO₃H, SO₃H, CH₃ | navy/black |
| 98 | 4-SO₃H-phenyl with 3-CH₂-N(CH₃)-Z | -phenyl-N=N-phenyl-SO₃H | greenish black |
| 99 | " | naphthyl with SO₃H, SO₃H, CH₃ | navy |
| 100 | Z-N(CH₃)-CH₂CH₂-SO₂-phenyl- | phenyl with HO₃S, SO₃H, CH₃ | navy/black |
| 101 | naphthyl with SO₃H, CH₃, CH₂-NH-Z | 4-SO₃H-phenyl | " |

TABLE 4-continued

[Structure: Z—B—D—N=N— attached to naphthalene bearing OH, NH₂, two SO₃H (HO₃S), with —N=N—D' on other side; Z = difluorotriazinyl group (2,4-difluoro-1,3,5-triazin-6-yl) shown with F, N, N, F, H]

| Example | Z—B—D— | D'— | Hue |
|---|---|---|---|
| 102 | 2-methyl-5-(CH₂—NH—Z)-1-sulfonaphthyl (SO₃H) | 2-(HO₃S)-phenyl | navy/black |
| 103 | " | 3,5-disulfophenyl (HO₃S, SO₃H) | " |
| 104 | " | 3-(HO₃S)-phenyl-N=N-4-(SO₃H)-phenyl | dark green/black |
| 105 | " | 2-methyl-1,5-disulfonaphthyl (SO₃H, SO₃H) | greenish blue |

EXAMPLES 107 to 130

Dyestuffs of these examples are obtained by using in Example 82 to 105 1-amino-8-hydroxy-4,6-naphthalenedisulphonic acid instead of the coupling component 1-amino8-hydroxy-3,6-naphthalenedisulphonic acid. By way of example, Example 107 is shown in the form of a formula:

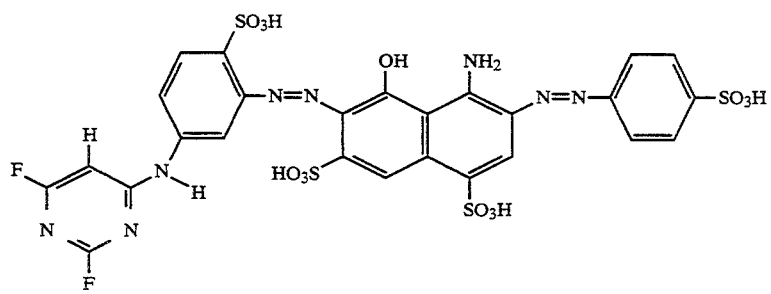

EXAMPLE 131

A solution of 52.6 g of 1-amino-8-hydroxy-3,6-naphthalenedisulphonic acid disodium salt in 250 ml of water is metered into the diazonium salt suspension of 49.2 g of the diazotisation solution from Example 60 over a period of 15 minutes. The mixture is stirred at a pH of 1.5–2.5 and a temperature of 5°–10° C. for one hour. The pH is then increased to 3.5 by slow addition of a 20% strength sodium acetate solution, and the mixture is stirred at this pH at 10° to 20° C. for another 3 hours. After coupling is complete, the pH is brought to 7.5 with 20% strength sodium carbonate solution.

The mixture of a diazoniumsalt obtained by diazotisation of 47.1 g of 2-amino-1,5-naphthalenedisulphonic acid monosodium salt is added to this red coupling solution over a period of 30 minutes, during which the pH is maintained in the range from 6.5 to 8.0 by addition of 20% strength sodium carbonate solution. The mixture is stirred at a pH of 7–8 for another 2 hours, and the product is salted out with a sufficient amount of potassium chloride. The precipitated dyestuff is isolated by filtering it off with suction and dried. The black dyestuff powder, which has the structure The reactive dyestuff can also be prepared by condensation of 2,4,6-trifluoropyrimidine with the disazo dye-stuff base of the formula

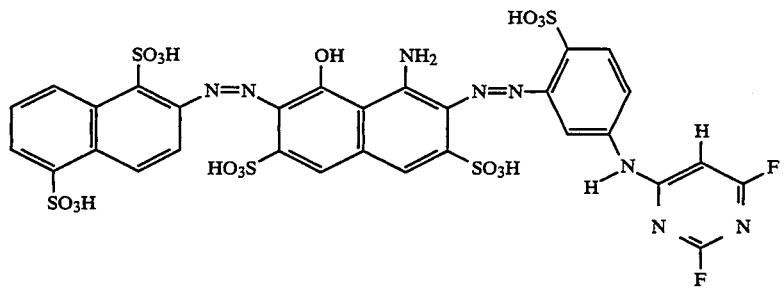

dyes cotton in navy to black hues.

By varying the fibre-reactive and also the non-fibre-reactive diazo component, further interesting reactive dye-stuffs can be synthesised analogously to Example 131:

TABLE 5

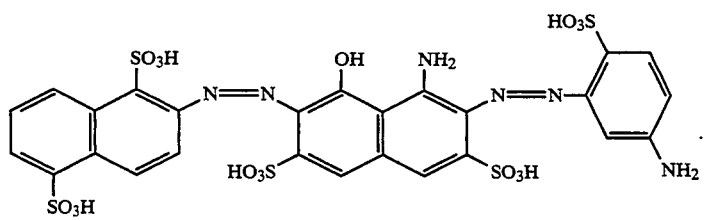

| Example | —D | —D'—B—A | Hue |
|---|---|---|---|
| 132 | ◯—SO₃H | HO₃S—◯—NH—Z | navy (606 nm) |
| 133 | HO₃S—◯— | " | navy (608 nm) |
| 134 | ◯—CO₂H | " | navy |
| 135 | CH₃—◯—SO₃H | " | navy |

TABLE 5-continued
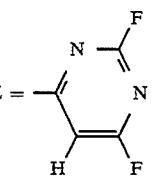
| Example | —D | —D'—B—A | Hue |
|---|---|---|---|
| 136 | 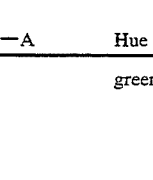 | " | greenish black |
| 137 | 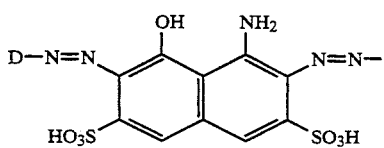 | 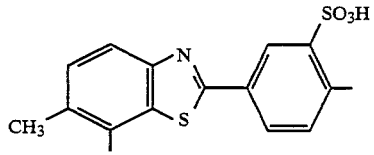 | greenish black |
| 138 |  | " | greenish navy |
| 139 | 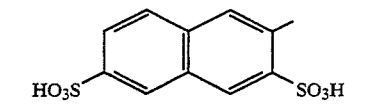 | " | " |
| 140 | 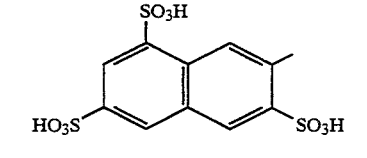 | 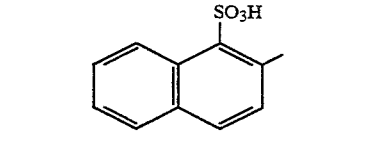 | navy |
| 141 | 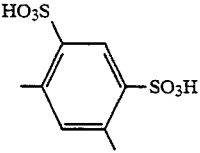 | 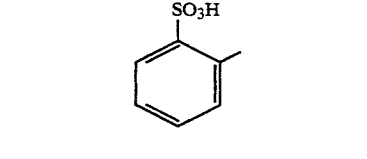 | navy |
| 142 | 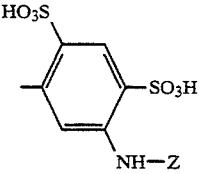 | 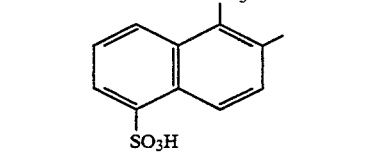 | greenish blue |
| 143 | 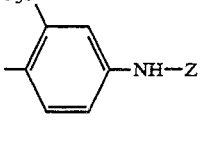 | " | " |

TABLE 5-continued

Structure:
D—N=N— [1-hydroxy-8-amino-3,6-disulfonaphthalene-2,7-diyl] —N=N—D'—B—Z Z = 2,4-difluoropyrimidin-5-yl (C=CH with F on pyrimidine ring)

| Example | —D | —D'—B—A | Hue |
|---|---|---|---|
| 144 | 2-methylnaphthalene-1-sulfonic acid | 2-methyl-5-(NH—Z)-benzene-1,4-disulfonic acid (HO₃S, SO₃H, NH—Z) | " |
| 145 | 2-methylbenzenesulfonic acid | " | " |
| 146 | 2-methyl-5-sulfo-naphthalene-1-sulfonic acid | 3-methyl-4-(HO₃S)-benzyl-N(CH₃)—Z | navy |
| 147 | 2-methylbenzenesulfonic acid | " | " |
| 148 | 5-methyl-2-methylbenzenesulfonic acid (CH₃ at 5-position) | " | " |
| 149 | 5-chloro-2-methylbenzenesulfonic acid | " | " |
| 150 | HO₃S—C₆H₄—N=N—C₆H₃(SO₃H)(CH₃)— | 3-methyl-4-(HO₃S)-benzyl-N(CH₃)—Z | dark green |
| 151 | 2-methylbenzenesulfonic acid | " | navy black |

TABLE 5-continued

Core structure: naphthalene with OH, NH₂, two SO₃H groups, substituted by D—N=N— and —N=N—D'—B—Z $$Z = \text{difluoropyrimidinyl group}$$

| Example | —D | —D'—B—A | Hue |
|---------|----|---------|-----|
| 152 | 2-methyl-benzene-1,4-disulfonic acid (SO₃H, HO₃S) | " | " |
| 153 | 2-methylnaphthalene-1,5-disulfonic acid | " | greenish navy |
| 154 | 2-methylnaphthalene-1,5-disulfonic acid | 2-methyl-5-(CH₂NH—Z)-naphthalene-1-sulfonic acid | greenish navy |
| 155 | 2-methylbenzenesulfonic acid | " | " |
| 156 | 4-methoxy-2-methylbenzenesulfonic acid (CH₃O—, SO₃H) | " | greenish black |
| 157 | HO₃S—C₆H₄—N=N—C₆H₃(SO₃H)(CH₃)— | 2-methyl-5-(CH₂NH—Z)-naphthalene-1-sulfonic acid | dark green |
| 158 | 2-methylbenzene-1,4-disulfonic acid | 4-(CH₂—N(CH₃)—Z)-phenyl | navy |
| 159 | 2-methylnaphthalene-1,5-disulfonic acid | 4-(NH—Z)-phenyl | greenish black |

TABLE 5-continued

| Example | —D | —D'—B—A | Hue |
|---|---|---|---|
| 160 | (2-methyl-benzene-1,4-disulphonic acid group: SO$_3$H / HO$_3$S) | —C$_6$H$_4$—NH—Z | greenish black | where the parent structure is:

D—N=N— [1-amino-8-hydroxy-naphthalene-3,6-disulphonic acid core with OH and NH$_2$] —N=N—D'—B—Z and $Z = $ difluoropyrimidinyl group.

EXAMPLES 161 to 190

Dyestuffs of these examples are obtained by using in Example 131 to 160 1-amino-8-hydroxy-4,6-naphthalenedisulphonic acid instead of the coupling component 1-amino-8-hydroxy-3,6-naphthalenedisulphonic acid. The hues of Examples 161 to 190 are all somewhat more reddish on cotton than the analogous dye-stuffs 131 to 160, such as, for example, Example 161:

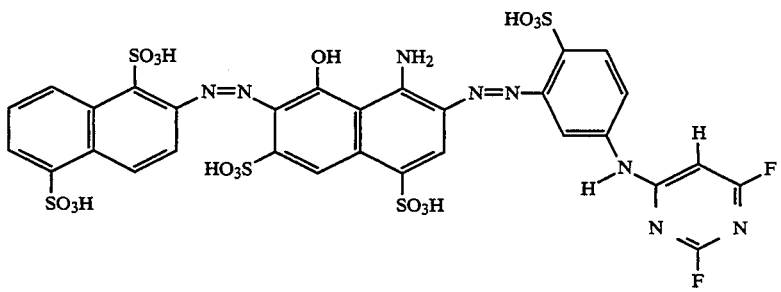

(somewhat more reddish than Example 131).

EXAMPLE 191

15.4 g of 2,4,6-trifluoropyrimidine are introduced into a neutralised solution of 41.9 g of 1-amino-4-(3'-amino-2'-methyl-5'-sulphophenylamino)-anthraquinone in 500 ml of water. While maintaining the pH at 6–7 with sodium carbonate solution, the mixture is stirred at 40°–50° C. until condensation is complete. The dye-stuff is salted out with sodium chloride, filtered off with suction and washed with 10% strength sodium chloride solution. The blue powder obtained after drying at 40° C. in vacuo has the formula:

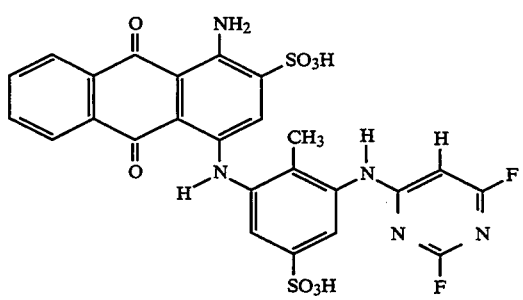

and dyes cotton in neutral blue shades ($\lambda$max 592 nm (H$_2$O)).

EXAMPLE 192

The procedure of Example 191 is repeated, using 21 g of 1-amino-4-(3'-amino-4'-sulphophenylamino)-anthraquinone-2-sulphonic acid, giving a dye-stuff of the formula

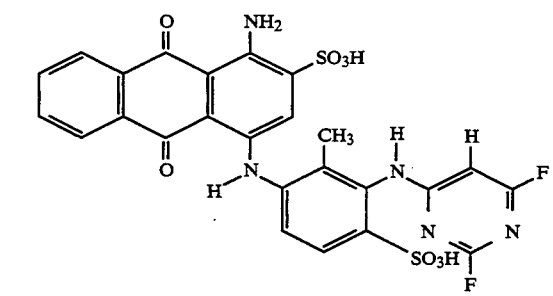

which dyes cotton in blue hues ($\lambda$max=596 nm (H$_2$O)).

EXAMPLES 193 to 211

If the aminoazo compounds listed in Table 6 below are reacted at pH 5–8 and temperatures of 40°–60° C. with 2,4,6-trifluoropyrimidine, dyestuffs are obtained which dye cotton in the hues given.

TABLE 6

| Ex. | Aminoazo compound | Hue | λmax (H₂O) |
|---|---|---|---|
| 193 | | deep red | |
| 194 | | deep red | |
| 195 | | deep red | |
| 196 | | deep red | |
| 197 | | deep red | |
| 198 | | deep red | |
| 199 | | deep red | |

TABLE 6-continued

| Ex. | Aminoazo compound | Hue | λmax (H$_2$O) |
|---|---|---|---|
| 200 | | deep red | |
| 201 | | deep red | |
| 202 | | deep red | |
| 203 | | deep red | |
| 204 | | deep red | |
| 205 | | deep red | |
| 206 | | red-violet | |

TABLE 6-continued

| Ex. | Aminoazo compound | Hue | λmax (H₂O) |
|---|---|---|---|
| 207 | | deep red | |
| 208 | | deep red | |
| 209 | | blue | 592 nm |
| 210 | | blue | |
| 211 | | navy | |

EXAMPLES 212 to 217

If the aminoazo compounds listed in Table 7 below are reacted in a known manner with equimolar amounts of hydrogen peroxide and copper sulphate and the dye-stuff bases formed are condensed to pH 5 to 8 and 40° to 60° C. with 2,4,6-trifluoropyrimidine, copper complex dyestuffs are obtained which dye cotton in the hues given, for example from the aminoazo compound from Example 212 the dye-stuff of the formula

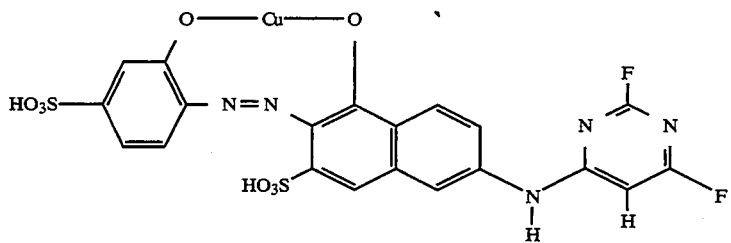

is obtained.

following dyestuffs are obtained, which dye cotton in

TABLE 7

| Ex. | Aminoazo compound | Hue | λmax (H₂O) |
|---|---|---|---|
| 212 | HO₃S—⟨ ⟩—N=N—[naphthalene with OH, SO₃H, NH₂] | deep red | |
| 213 | HO₃S—⟨ ⟩—N=N—[naphthalene with OH, SO₃H, NH₂, SO₃H] | deep red | |
| 214 | HO₃S—⟨ ⟩—N=N—[naphthalene with OH, SO₃H, NH₂] | deep red | |
| 215 | HO₃S—⟨ ⟩—N=N—[naphthalene with OH, SO₃H, NH₂, SO₃H] | deep red | |
| 216 | [disulfonaphthalene]—N=N—[naphthalene with OH, SO₃H, NH₂, SO₃H] | blue | |
| 217 | HO₃S—[naphthalene-SO₃H]—N=N—[naphthalene with OH, SO₃H, NH₂, SO₃H] | navy | 560 nm |

EXAMPLES 218 to 222

If the corresponding dye-stuff bases are reacted with 2,4,6-trifluoropyrimidine at pH 5–8 and 40°–60° C., the following dyestuffs are obtained, which dye cotton in the hues given:

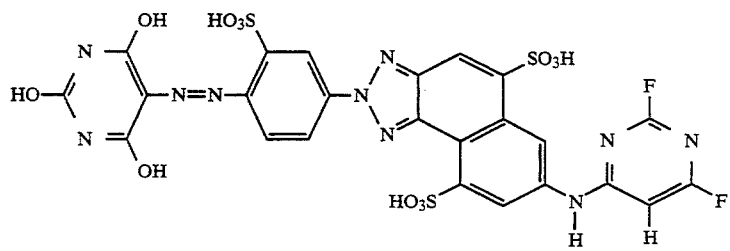
218
yellow, λmax = 415 nm (H2O)
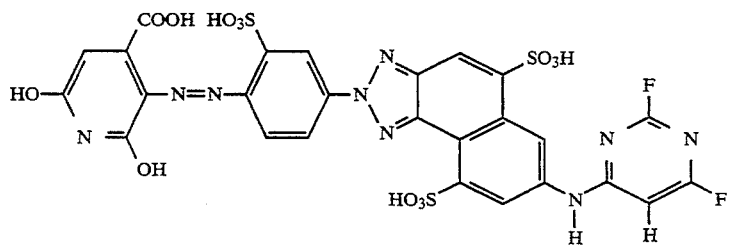
219
yellow, λmax = 443 nm (H2O)
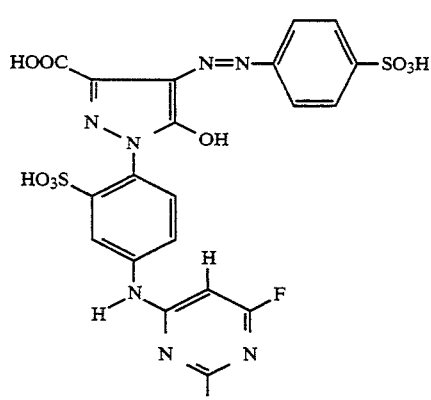
220
yellow, λmax = 432 nm (H2O)
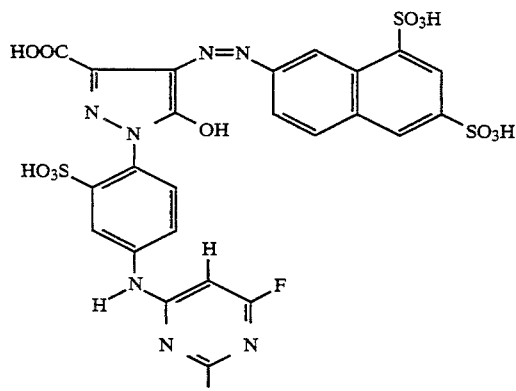
221
golden yellow, λmax = 448 nm (H2O)
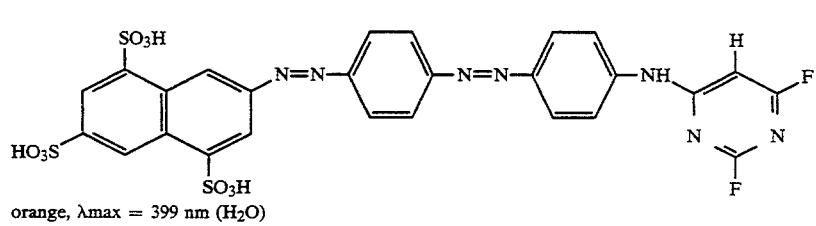
222
orange, λmax = 399 nm (H2O)
We claim:
1. A reactive dye-stuff which, in the form of the free acid, has the formula (I)

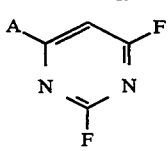
in which
A is a chromophoric radical of one of the following structures
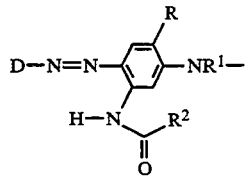 (2)
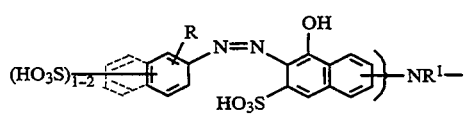 (3)
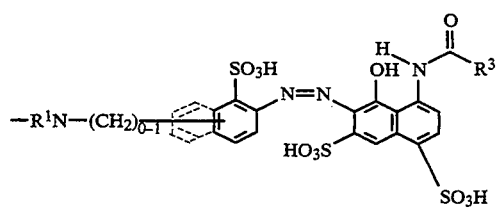 (4)
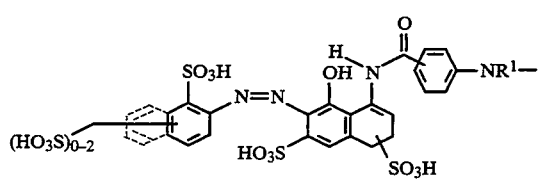 (5)
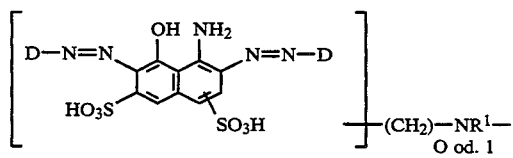 (6)
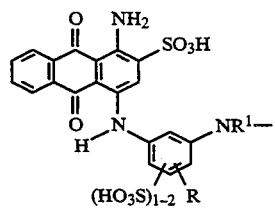 (7)
or a metal complex of dyestuffs of the formulae (8)–(11)
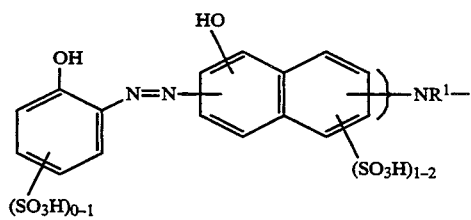 (8)
-continued
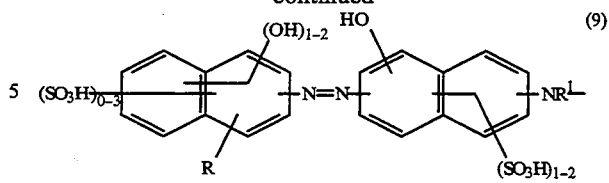 (9)
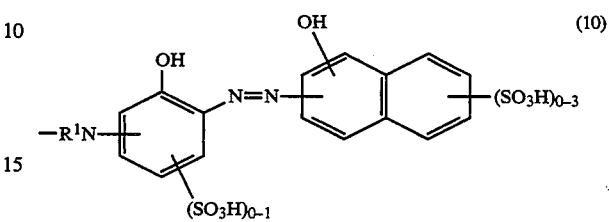 (10)
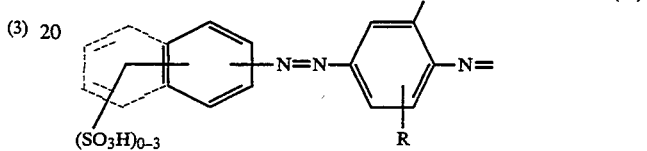 (11)
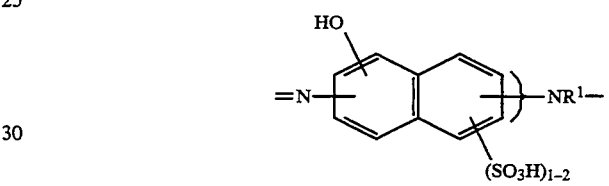 
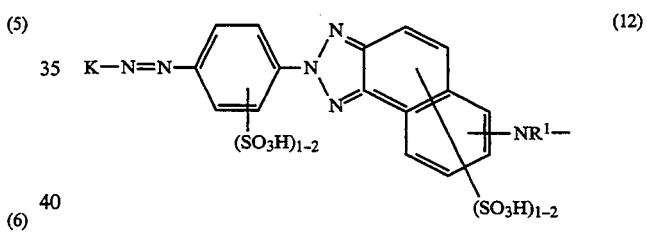 (12)
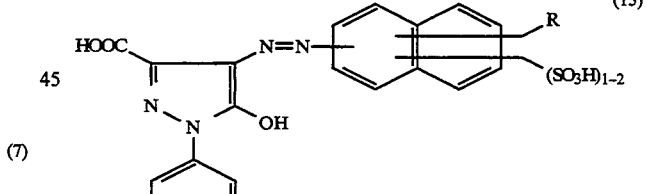 (13)
or
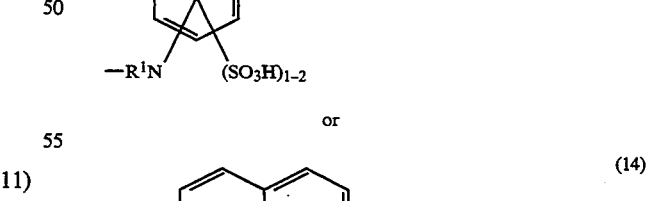 (14)
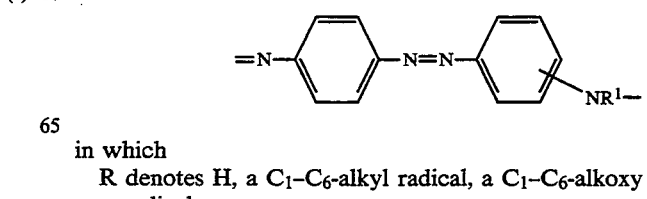
in which
R denotes H, a $C_1$–$C_6$-alkyl radical, a $C_1$–$C_6$-alkoxy radical, $R^1$ denotes H, $R^2$ denotes $NH_2$, a $C_1$-$C_4$-alkyl radical which is unsubstituted or substituted by OH, $SO_3H$, $OSO_3H$ or $CO_2H$, a $C_1$-$C_4$-alkoxy radical which is unsubstituted or substituted by OH, $SO_3H$, $OSO_3H$ or $CO_2H$, $R^3$ denotes a $C_1$-$C_4$-alkyl radical which is unsubstituted or substituted by OH, $SO_3H$, $OSO_3H$ or $CO_2H$, a phenyl radical which is unsubstituted or substituted by $C_1$-$C_4$-alkyl, halogen or $SO_3H$, D represents a sulpho- or carboxy-containing radical of a diazo component from the benzene, naphthalene or hetaryl series, which additionally may be substituted by alkyl, alkoxy, carboxyl or halogen radicals. In formula (6) one of the two radicals D contains an optionally substituted 2,6-difluoro-4-pyrimidinylamino, -methylamino or -ethylamino substituent, it being possible in this case for D to be free of sulpho groups or to contain sulpho groups.

K represents a coupling component, with the exception of compounds 15 and 16

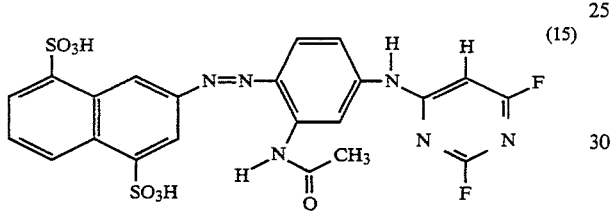
(15)

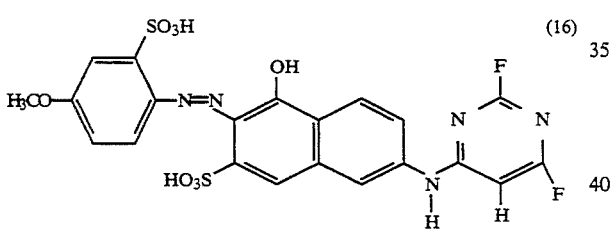
(16)

2. Reactive dye-stuff according to claim 1, characterised in that K is a pyridone, pyrazolone, barbituric acid or citrazinic acid derivative.

3. Reactive dye-stuff according to claim 1, characterised in that A is a radical of the formula 2 to 12, in which
R is H, $CH_3$, $OCH_3$, $OC_2H_5$,
$R^1$ is H, $CH_3$,
$R^2$ is $NH_2$, a $C_1$-$C_4$-alkyl radical which is unsubstituted or substituted by OH, $SO_3H$, $OSO_3H$ or $CO_2H$, 4. Reactive dye-stuff according to claim 1 a) wherein A is a radical of the formula (2), in which
R is H,
$R^1$ is H,
$R^2$ is $NH_2$, a $C_1$-$C_4$-alkyl radical which is unsubstituted or substituted by OH, $SO_3H$, $OSO_3H$ or $CO_2H$, and D is

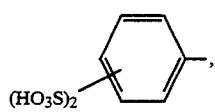,

-continued

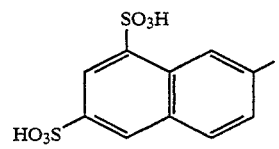

or

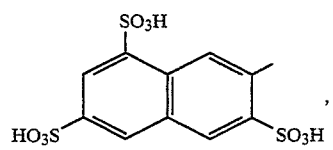, or b) wherein A is a radical of the formula (3), in which
R is H, $CH_3$, $OC_2H_5$,
$R^1$ is H, or c) wherein A is a radical of the formula (4)–(5), in which
$R^1$ is H,
$R^3$ is $CH_3$, a phenyl radical which is unsubstituted or substituted by $C_1$-$C_4$-alkyl, halogen or $SO_3H$,
or d) wherein A is a radical of the formula

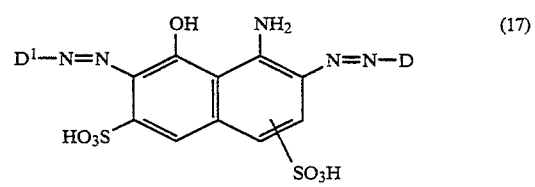
(17)

in which
D is

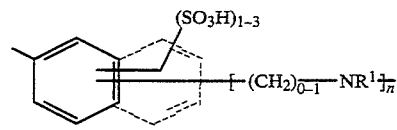

$D^1$ is

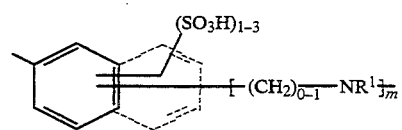

$R^1$ is H
n is 0 or 1, and
m is 0 or 1 but n+m is 1, or e) wherein A is a radical of the formula

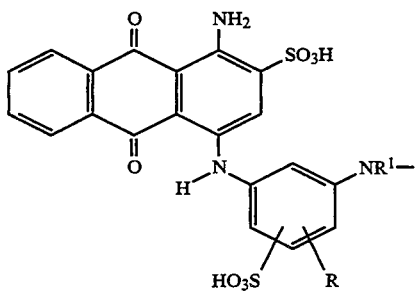
(18)
in which
R is H, CH₃, OCH₃,
R¹ is H, or
f) wherein A is a radical of the formula (12), in which R is H, or
g) wherein A is a radical of the formula (12), in which R is H and K has the abovementioned meaning.
5. Reactive dyestuff according to claim 1 of one of the following formulas
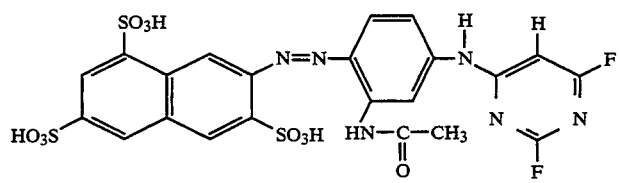
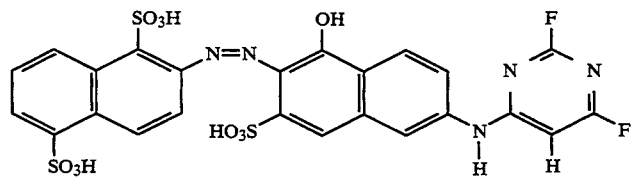
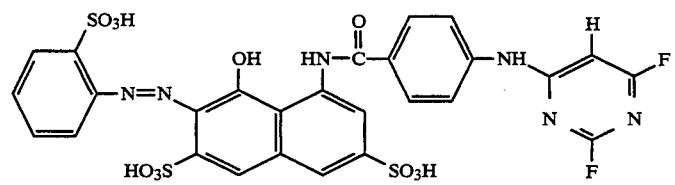
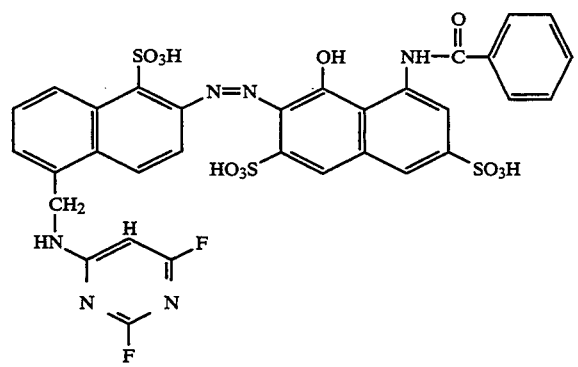

-continued
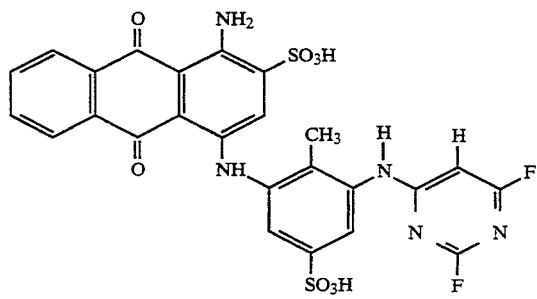
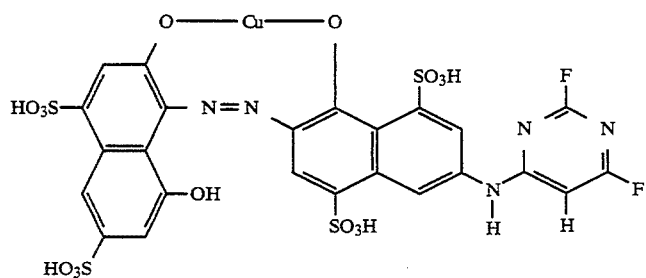
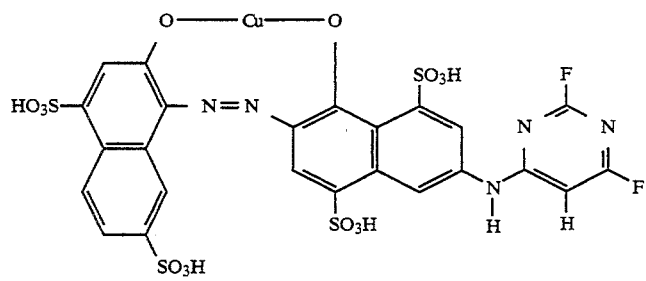
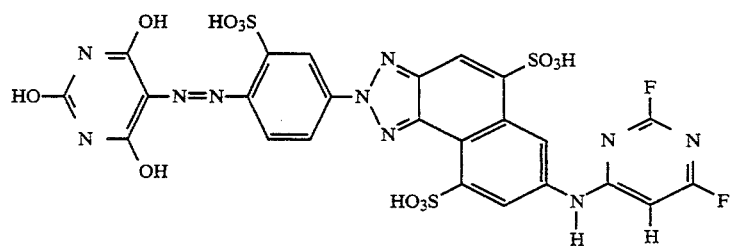
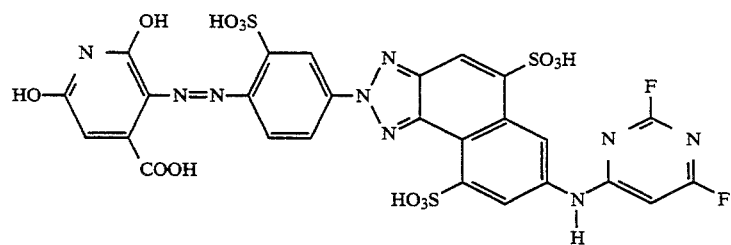
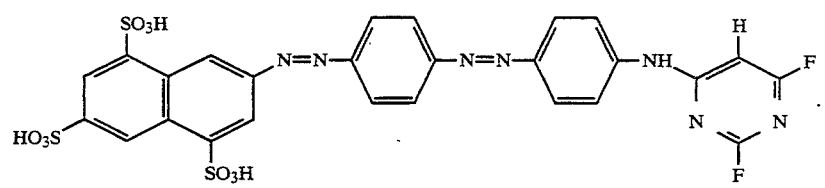
* * * * *

UNITED STATES PATENT AND TRADEMARK OFFICE
CERTIFICATE OF CORRECTION

PATENT NO. : 5,436,324
DATED     : July 25, 1995
INVENTOR(S) : Reddig, et al.

It is certified that error appears in the above-indentified patent and that said Letters Patent is hereby corrected as shown below:

Col. 51, line 30    Delete 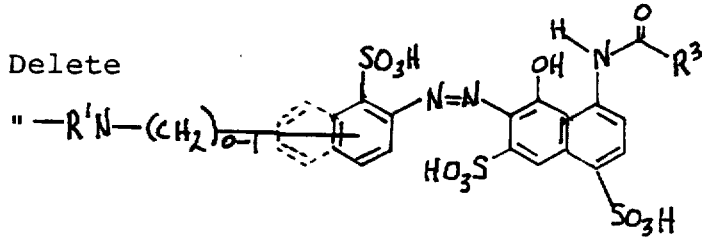

and substitute 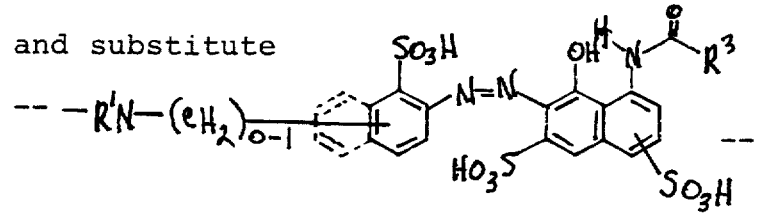

Signed and Sealed this

Second Day of January, 1996

Attest:

BRUCE LEHMAN

Attesting Officer    Commissioner of Patents and Trademarks